Dec. 13, 1955   G. A. DU ROCHER   2,727,200
D. C. MOTOR REVERSING DEVICE
Filed May 18, 1954
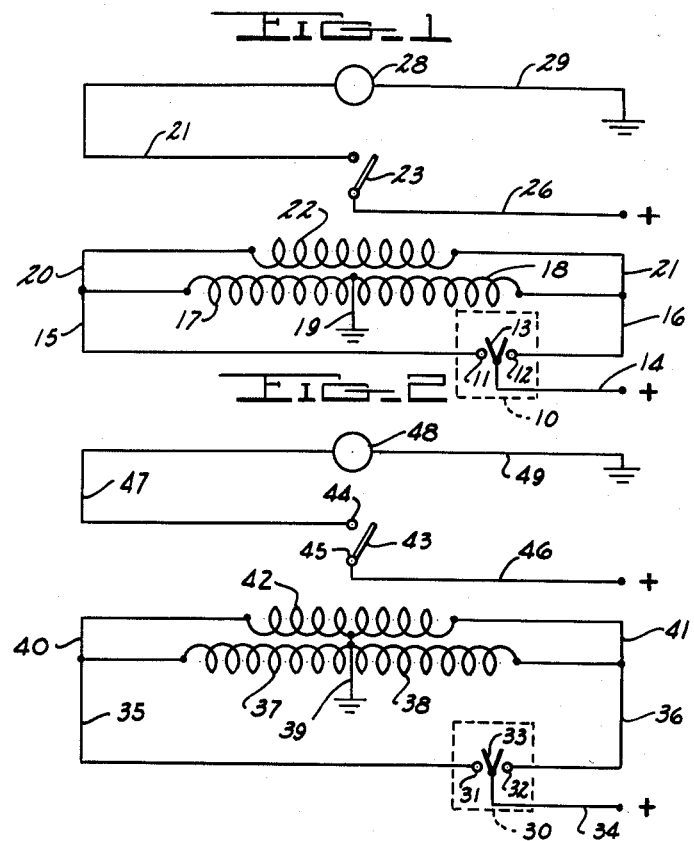
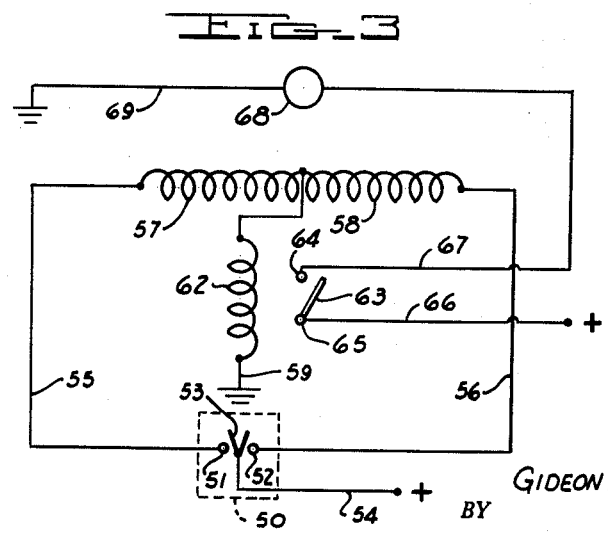
INVENTOR.
GIDEON A. DUROCHER
BY
ATTORNEYS

United States Patent Office 2,727,200
Patented Dec. 13, 1955

2,727,200
D. C. MOTOR REVERSING DEVICE

Gideon A. Du Rocher, Grosse Pointe, Mich., assignor to Essex Wire Corporation

Application May 18, 1954, Serial No. 430,513

2 Claims. (Cl. 318—297)

This invention relates to a device for starting and reversing a D. C. motor.

In order that a D. C. motor reverse itself, it is generally necessary to vary one magnetic field with respect to the other. Thus, when current from a common source is applied to an armature winding and a field winding, either the armature current must be reversed or the field current must be reversed in order that the armature be made to reverse its direction of rotation. It is common practice to use a relay to obtain whatever current reversal is desired. In general two relay coils have been employed, alternately energizable by a switch. The relays in turn provide for alternate directional current flow in either the armature or the field.

This invention provides a new means for accomplishing the reversal of current flow in a motor winding which is simple, efficient, and low in cost. The motor reversal effected is particularly useful in such D. C. applications as raising or lowering automobile windows or adjusting automobile seats for operator comfort. The armature of the motor is linked mechanically to the window or seat for adjustment thereof. The present device provides a simple low cost unit adapted for mass production and long useful life.

In the drawings,

Fig. 1 is a schematic wiring diagram illustrating the present invention used in conjunction with a split shunt motor.

Fig. 2 is a modification of the invention disclosed in Fig. 1 wherein the relay coil is center tapped to ground to avoid having the relay coil current track to ground in opposition to the field current.

Fig. 3 is a further modification wherein the relay is inserted in a split shunt ground circuit.

In general, the operation of the device involves the use of a center return switch to reverse the flow of the field current and to simultaneously energize the coil of a single pole double throw relay. Irrespective of the direction of current flow in the field the relay is actuated to close the armature circuit. Thus, it can be said that armature current always flows in the same direction whereas field current is reversible by means of a simple switch.

Fig. 1 illustrates the invention as applied to a split shunt motor, the + potential being common to both the field and the armature circuits. The center return switch 13 is adapted for contacting engagement with either contact 12 or contact 11 as long as the switch is manually held in contacting engagement. When the switch 13 is closed against contact 12, a current path is closed from the + potential to contact 12, lead 16, split shunt winding 18, and ground 19. Current also flows in the parallel relay coil winding 22, split shunt winding 17, and ground 19.

The energization of relay coil 22 pulls in the relay contact arm 23 and armature current is thereby supplied the armature 28 from the + potential to lead 26, contact arm 23, lead 21, armature 28, lead 29, and ground. From this diagram it can be seen that the switch 13 is used to direct current through the separate field windings, in this manner the field current is effectively reversed. Armature current on the other hand always flows in the same direction.

Fig. 2 is a further modification of the device illustrated in Fig. 1. In this case, the relay coil is center tapped to ground. It can be noted in Fig. 1 that the current which passes through the relay coil 22 tracks to ground through either the split shunt winding 17 or 18 dependent upon the position of the switch 13. This current, therefore, bucks the current in the split shunt winding which may be found to be undesirable. In Fig. 2, the relay coil is, therefore, center tapped to ground and as a result no bucking current is passed to the field winding.

A further modification is illustrated in Fig. 3 wherein the relay for closing the armature circuit is included in the ground return circuit of the field winding. In this case, current will flow from the + potential through switch 53 to split shunt windings 57 or 58 as hereinbefore described. Current through either field winding energizes relay coil 62. Contact arm 63 is thereby closed and armature current flows from the + potential to lead 66, contact arm 63, lead 67, armature 68, lead 69 to ground. It is again seen that mere reversal of the field current by the use of a switch can be used for the starting and the reversing of a motor armature.

What is claimed is:

1. In combination, a D. C. motor having a split shunt field providing separate fields, a source of power, a relay in parallel with said split field and adapted to close an electrical circuit from said source of power to the armature winding of said motor, switching means adapted to alternately complete an electrical circuit from said source of power to the separate field windings whereby said motor can be excited in different directions to provide motor reversal.

2. In combination, a D. C. motor having a split shunt field providing separate fields, a source of power, a relay in parallel with said split field and adapted to close an electrical circuit from said source of power to the armature winding of said motor, said relay further characterized by being center tapped to ground to avoid passing relay coil current to the separate and parallel field windings, switching means adapted to alternately complete an electrical circuit from said source of power to the separate field windings whereby said motor can be excited in different directions to provide motor reversal.

References Cited in the file of this patent
UNITED STATES PATENTS

| | | |
|---|---|---|
| 2,435,440 | Graham | Feb. 3, 1948 |
| 2,466,984 | Gilbert | Aug. 12, 1949 |